US007961191B2

(12) United States Patent
Terazono et al.

(10) Patent No.: US 7,961,191 B2

(45) Date of Patent: Jun. 14, 2011

(54) OUTLINE FONT BRIGHTNESS VALUE CORRECTION SYSTEM, METHOD AND PROGRAM

(75) Inventors: Kohei Terazono, Kawasaki (JP); Satoshi Iwata, Kawasaki (JP); Masashi Takechi, Hyogo (JP)

(73) Assignee: Fujitsu Limited, Kawasaki (JP)

( * ) Notice: Subject to any disclaimer, the term of this patent is extended or adjusted under 35 U.S.C. 154(b) by 912 days.

(21) Appl. No.: 11/847,892

(22) Filed: Aug. 30, 2007

(65) Prior Publication Data

US 2008/0088640 A1 Apr. 17, 2008

(30) Foreign Application Priority Data

Oct. 16, 2006 (JP) ................................ 2006-281825

(51) Int. Cl.

*G06T 11/00* (2006.01)

*G09G 5/24* (2006.01)

(52) U.S. Cl. ...................................... 345/467; 345/611

(58) Field of Classification Search .................. 345/467, 345/611, 613, 614; 358/1.11

See application file for complete search history.

(56) References Cited

U.S. PATENT DOCUMENTS

| | | | | |
|---|---|---|---|---|
| 5,309,259 | A * | 5/1994 | Taki et al. | 358/528 |
| 2004/0109005 | A1 * | 6/2004 | Witt et al. | 345/611 |

FOREIGN PATENT DOCUMENTS

| | | |
|---|---|---|
| JP | 8-255254 | 10/1996 |
| JP | 8-272353 | 10/1996 |
| JP | 11-38960 | 2/1999 |
| JP | 2000-137480 | 5/2000 |

* cited by examiner

*Primary Examiner* — Jeffery A Brier

(74) *Attorney, Agent, or Firm* — Staas & Halsey LLP

(57) ABSTRACT

Having an outline font data readout unit read a correction subject pixel and surrounding pixels thereof, referring to the already stored pre-correction and post-correction brightness value pattern data that are related to the read correction subject pixel and surrounding pixels, deriving a post-correction brightness value pattern uniquely from among candidates for a post-correction brightness value pattern of an appropriate value as post-correction brightness value, determining the optimal post-correction brightness value from the uniquely derived post-correction brightness value pattern and outputting correction data based on the determined optimal post-correction brightness value, thereby changing a brightness value of a pixel within a character image giving a look of unnaturalness automatically to a brightness value not giving a look thereof.

7 Claims, 14 Drawing Sheets

OUTLINE FONT BRIGHTNESS VALUE CORRECTION SYSTEM, METHOD AND PROGRAM

BACKGROUND OF THE INVENTION

1. Field of the Invention

The present invention relates to an outline font brightness value correction technique for eliminating a look of blot or irregularity of brightness value associated with a grayscale display of an outline font character.

2. Description of the Related Art

A use of an outline font makes it possible to display a high quality character in a free size based on one piece of data when displaying a character in equipment having a display device such as a Liquid Crystal Display (LCD).

The outline font used to be mainly utilized for a computers with a high computing process capability because of a necessity of calculation of contour lines and/or that of painting over within the contour lines until the recent years witnessing a use of the outline font for a built-in type piece of equipment such as a portable phone thanks to an improved process capability thereof.

When using the outline font in a display of a portable phone or the like, a user feels unnaturalness such as "the contour is blotted" and "the brightness is uneven" if the brightness is in half tone in a grayscale display although a grayscale display makes it possible to smooth out raggedness of the contour of a character.

Conventional methods for avoiding a feel of a user such as "the contour is blotted" and "the brightness is uneven" in a grayscale of the contour lines of the outline font include one that pre-attaches correction data for a grayscale value to outline font character data as shown in FIG. 1, and one that adjusts a position of a contour line by a calculation when processing for a display as shown in FIG. 2.

FIG. 1 is a block diagram showing a configuration of a first conventional system. The characteristic of the first conventional system is to comprise correction data generation means 73 for reading and displaying pre-correction outline font data 71 in character image display means 72 and generating corrected data by carrying out a manual work of inputting the correction data for a part of the displayed pre-grayscale correction outline font in which a user feels "unnatural half tone" until the user feels "natural", and provide outline font data 74 as a result of the correction data generated by the correction data generation means 73 being added. As such, the first conventional system shown in FIG. 1 is configured for a person in charge of a design (i.e., a font designer) to apply a correction of a grayscale value to uncorrected outline font character data, so as to make a natural half tone, thereby making an output character image as a very high quality.

The first conventional system, however, is configured for a person in charge of a design (i.e., a font designer) to apply a correction of a grayscale value to uncorrected outline font character data, so as to make a natural half tone, and add it to the font data, thereby making the output character image a very high quality, and therefore is faced with the problem of requiring a tremendous amount of time and cost because a font designer must carry out a manual work of generating correction data for grayscale values of the entirety of Japanese fonts counting several thousands.

FIG. 2 is a block diagram showing a configuration of a second conventional system. The second conventional system is characterized by comprising reading a contour line from pre-correction outline font data 81 by employing contour line readout means 82, adjusting (i.e., fitting or such) a position of the contour line by a calculation of contour line position calculation means 83 and drawing a figure based on the contour line that is adjusted for position, and painting it over, by employing contour line drawing & paint-over means 84, followed by displaying the character image in character image display means 85.

FIGS. 3A and 3B are diagrams exemplifying an image display by the configuration of the second conventional system as described above, with FIG. 3A showing the case of applying no correction anywhere including the right bottom side of the character "articles" (which is an English word for the Kanji character shown in the drawing) for the grayscale display of the contour line of the outline font and FIG. 3B showing the case of applying a correction by means of a fitting to pixels existing on the right bottom side of the character "articles" for the grayscale display of the contour line of the outline font. As such, the configuration of the second conventional system is capable of eliminating a look of unnaturalness in the grayscale display by changing a thickness ratio of the horizontal column to vertical column of a character image existing on the right bottom side on the character "articles" as a result of applying a correction (i.e., fitting). On the other hand, a balance of length between the right vertical column and left vertical column can no longer be maintained, resulting in becoming a character that cannot be regarded as good character quality in a viewpoint of the user. Yet overall, the display example shown in FIG. 3B is capable of preventing the grayscale display of the contour line of an outline font from giving a look of unnaturalness by applying a correction by means of a fitting as compared to the case of the display example shown in FIG. 3A.

The second conventional system, however, is configured to move a contour line (i.e., an outline) only by the movement amount obtained by a calculation and therefore is faced with the problem of resulting in carrying out a correction that degrades a character quality significantly such as losing the characteristic of an original font of an output character image, even if the blot and/or uneven brightness values thereof can be reduced.

Incidentally, there are two approaches in the method for adjusting the position of a contour line by a calculation for a display process according to the second conventional system shown in FIG. 2. A first approach disclosed in reference patent documents 1 and 2 uses a method for moving it to the closest grid (e.g., a border line of an actual pixel) for the entirety of the contour lines, so as not to display a half tone regarding the horizontal and vertical lines. The display example shown in FIG. 3B shows a character image display example by the method. Meanwhile, a second approach disclosed in reference patent documents 3 and 4 calculates a movement amount of a line position in consideration of a movement amount of another contour line included in a single character, followed by moving it to an optimal position, thereby maintaining a consistency of line width and removing an uneven grayscale.

Patent document 1: Laid-Open Japanese Patent Application Publication No. H08-255254

Patent document 2: Laid-Open Japanese Patent Application Publication No. H11-38960

Patent document 3: Laid-Open Japanese Patent Application Publication No. H08-272353

Patent document 4: Laid-Open Japanese Patent Application Publication No. 2000-137480

SUMMARY OF THE INVENTION

The present invention is contrived to have an outline font data readout unit read a correction subject pixel and surrounding pixels thereof, refer to the already stored pre-correction and post-correction brightness value pattern data that are related to the read correction subject pixel and surrounding pixels thereof, derive a post-correction brightness value pattern uniquely from among candidates for a post-correction brightness value pattern of an appropriate value as a post-correction brightness value, determine the optimal post-correction brightness value from the uniquely derived post-correction brightness value pattern and output correction data based on the determined optimal post-correction brightness value. The use of outline font data thusly added by the correction data provides an advantage of rendering a character quality as not giving a look of a blot and/or uneven brightness value when performing a grayscale display of an outline font character without degrading a character quality.

In the case of developing an outline font anew and incorporating it in a piece of equipment, the present invention is contrived to obtain brightness value correction data by an automated correction work, thereby providing an advantage of enabling a development time to be greatly shortened as compared to the method of obtaining such correction data manually as in the above described first conventional system.

DESCRIPTION OF THE PREFERRED EMBODIMENTS

The following is a description of the preferred embodiment of the present invention by referring to the accompanying drawings.

Figure 1:
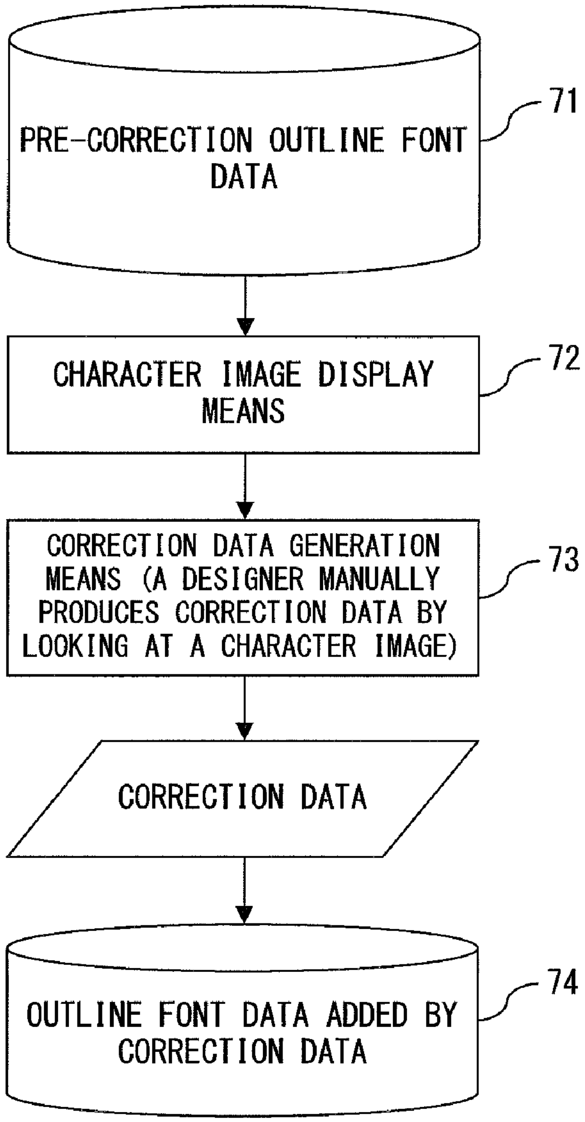
FIG. 1 Prior Art
FIG. 1 is a block diagram showing a configuration of a first conventional system.
Figure 2:
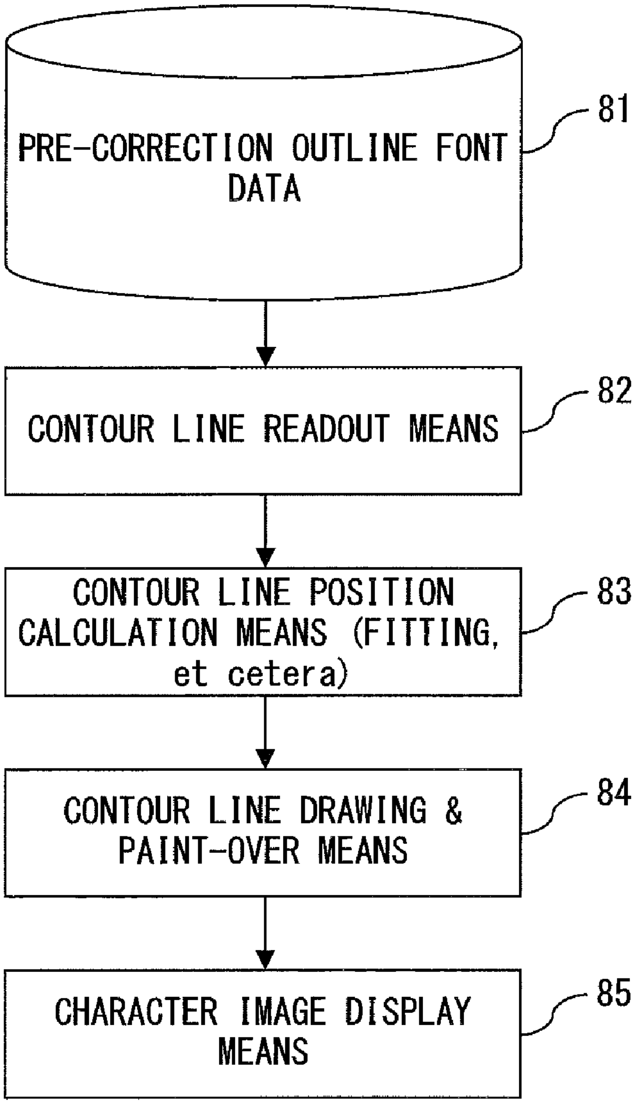
F I G. 2 Prior Art
FIG. 2 is a block diagram showing a configuration of a second conventional system.
Figure 3B:
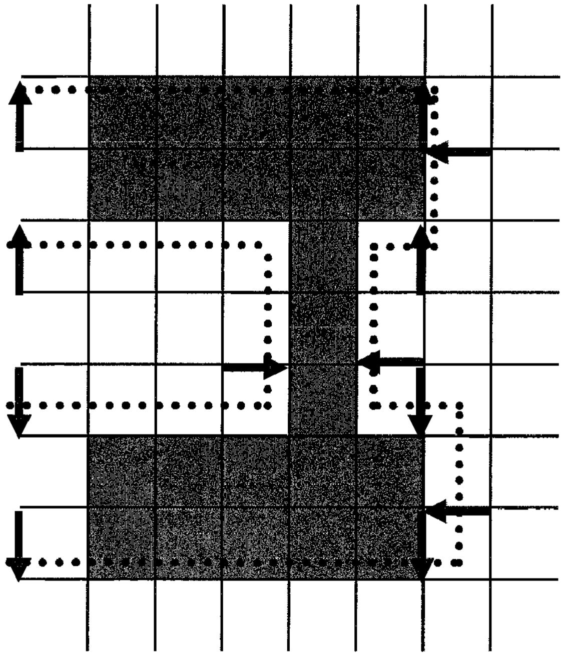
FIG. 3B is a diagram exemplifying an image display by a configuration of the second conventional system, indicating a post-correction by a fitting.
Figure 3A:
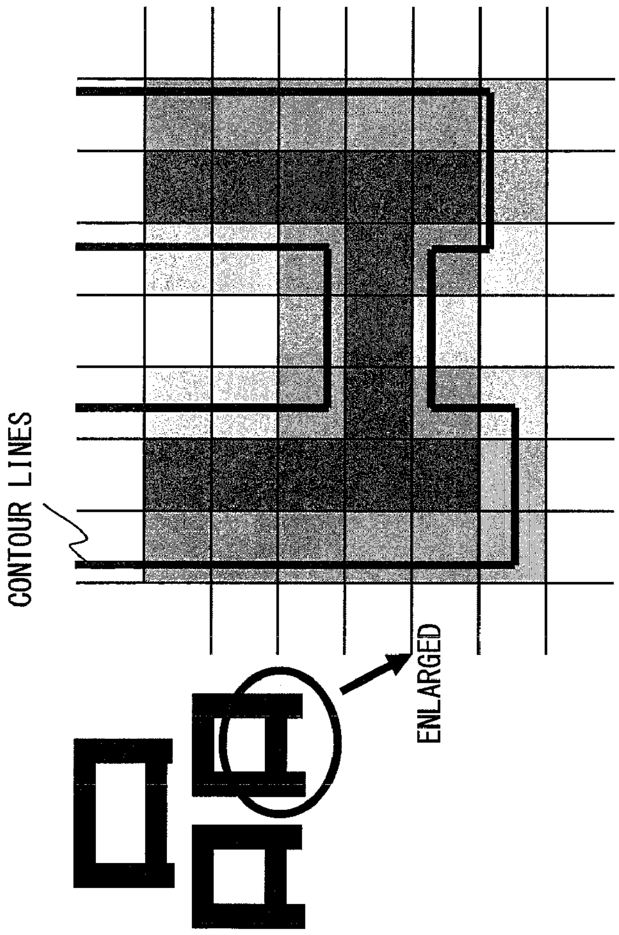
FIG. 3A Prior Art
FIG. 3A is a diagram exemplifying an image display by a configuration of the second conventional system, indicating a pre-correction state.
Figure 4:
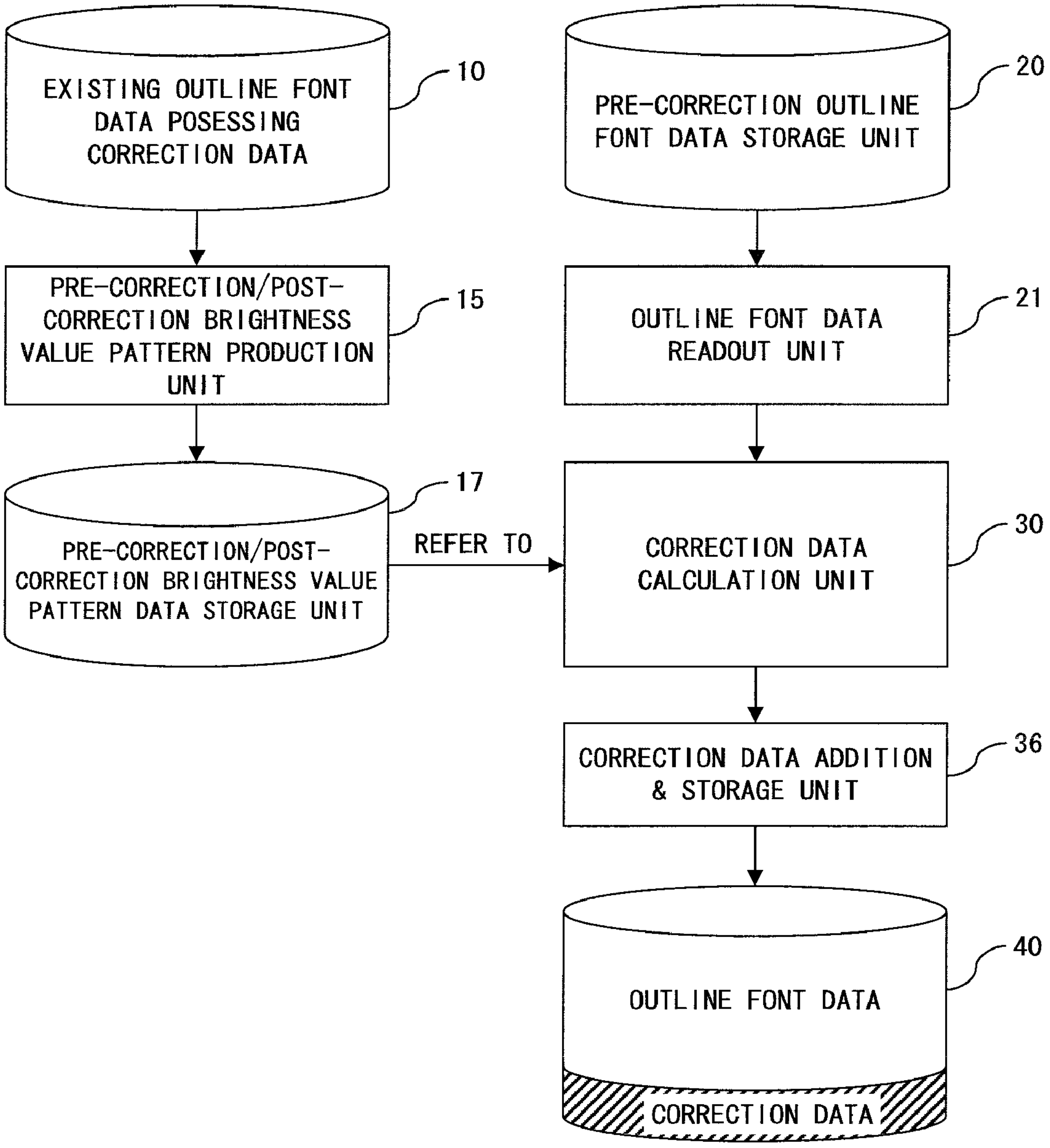
FIG. 4 is a block diagram showing an outline configuration of an outline font brightness value correction system according to a preferred embodiment of the present invention.

FIG. 4 is a block diagram showing an outline configuration of an outline font brightness value correction system according to a preferred embodiment of the present invention. Referring to FIG. 4, the outline font brightness value correction system according to the preferred embodiment of the present invention comprises an existing outline font data storage unit 10 possessing correction data already created by a user as well as outline font data, a pre-correction/post-correction brightness value pattern production unit 15 for producing a pre-correction brightness value pattern related to a correction subject pixel and surrounding pixels thereof extracted from the outline font data storage unit 10 and also producing a post-correction brightness value pattern by referring to correction data added to the correction subject pixel and surrounding pixels thereof extracted from the outline font data storage unit 10, a pre-correction/post-correction brightness value pattern data storage unit 17 for storing the produced pre-correction/post-correction brightness value pattern, a pre-correction outline font data storage unit 20 possessing outline font data only and none of correction data, an outline font data readout unit 21 for reading a correction subject pixel and surrounding pixels thereof from the outline font data storage unit 20, a correction data calculation unit 30 for calculating correction data automatically by referring to the pre-correction/post-correction brightness value pattern data, which is stored in the pre-correction/post-correction brightness value pattern data storage unit 17, related to the correction subject pixel and the surrounding pixel thereof that is read by the outline font data readout unit 21, a correction data addition & storage unit 36 for adding the correction data calculated by the correction data calculation unit 30 to the pre-correction outline font data storage unit 20 and storing therein, and an outline font data storage unit 40 which possesses outline font data and to which the newly produced correction data is added.

Figure 5:
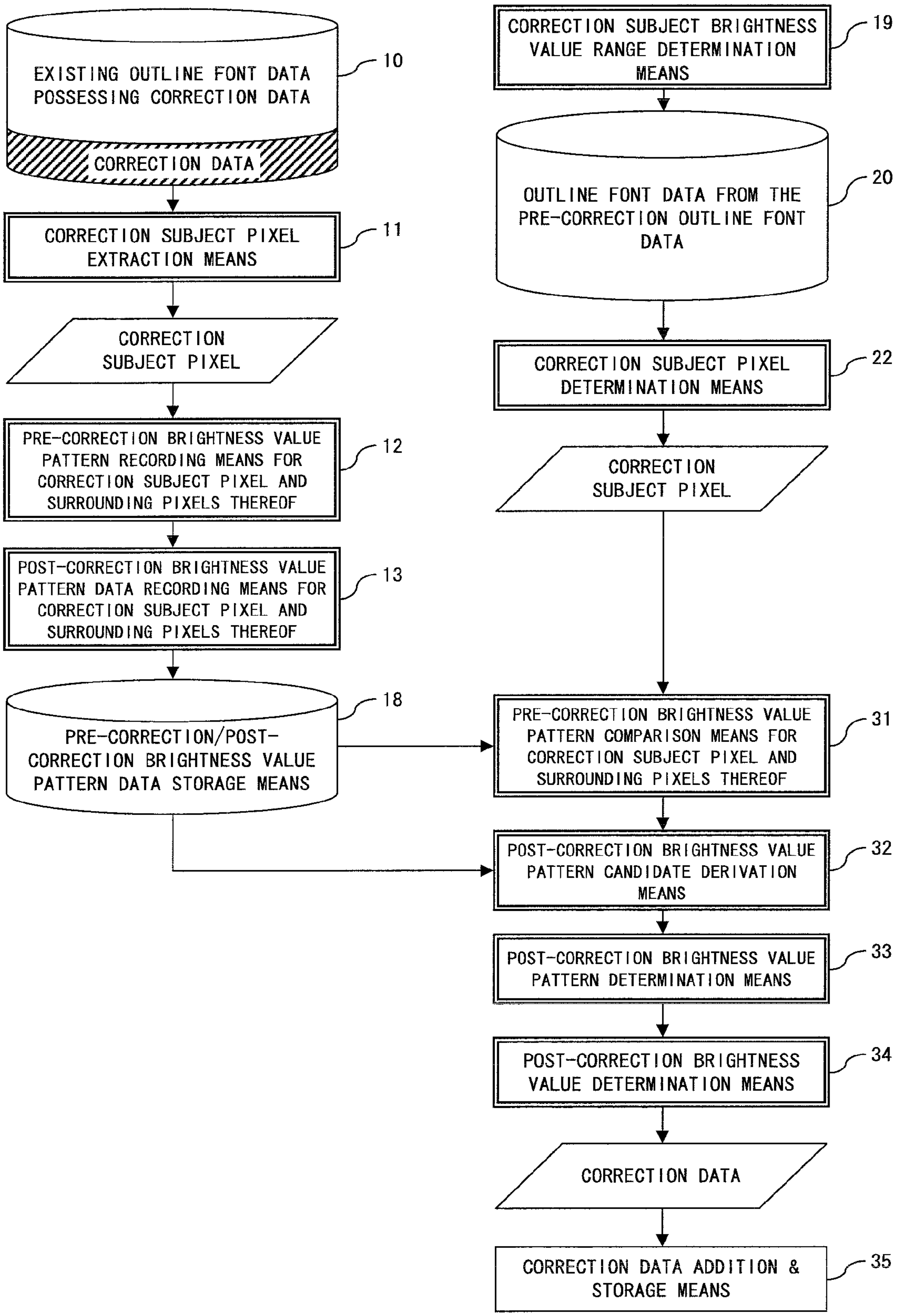
FIG. 5 is a block diagram showing a detail configuration of an outline font brightness value correction system according to a preferred embodiment of the present invention.

FIG. 5 is a block diagram showing a detail configuration of an outline font brightness value correction system according to a preferred embodiment of the present invention. In the outline font brightness value correction system according to the preferred embodiment of the present invention, the existing outline font data storage unit 10 possessing correction data already created by a user as well as outline font data stores the outline font data and also possesses the already produced correction data with regard to a correction subject pixel and the surrounding pixels thereof.

A correction subject pixel extraction means 11 extracts a pixel as a subject of correction from the existing outline font data storage unit 10.

A pre-correction brightness value pattern recording means 12 records respective patterns of brightness values of the extracted correction subject pixel and the surrounding pixels thereof as a pre-correction brightness value pattern, where the "surrounding" is defined as a comprisal constituted by a correction subject pixel and the 8 or 24 surrounding pixels that surround the correction subject pixel at the center, which consists of a fixed number of surrounding pixels suitable to a character size.

A post-correction brightness value pattern data recording means 13 refers to the added correction data with regard to the respective brightness value of a correction subject pixel and surrounding pixels thereof, and records the corresponding pattern of a brightness value as a post-correction brightness value pattern. The post-correction brightness value pattern is a value having a predetermined range.

A pre-correction/post-correction brightness value pattern data storage means 18 stores, in a pattern data storage area, a post-correction brightness value pattern by correlating it, which is to be recorded by the post-correction brightness value pattern data recording means 13, with a pre-correction brightness value pattern which is to be recorded by the pre-correction brightness value pattern recording means 12. The data storage means can employ a various devices such as a magnetic disk and semiconductor memory.

Figure 6:
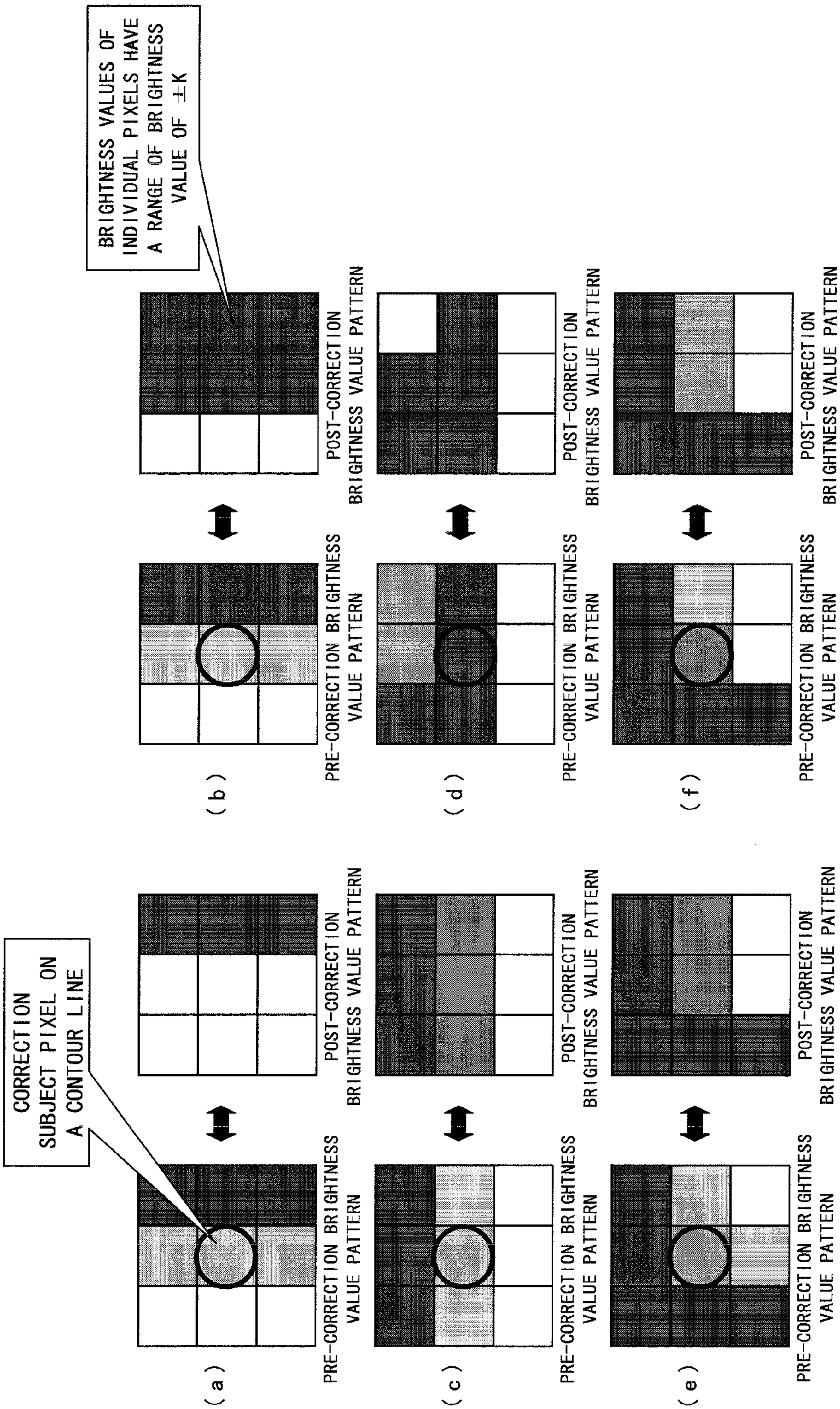
FIG. 6 is a block diagram showing an example of pattern data according to a preferred embodiment of the present invention.

Now FIG. 6 is referred to. FIG. 6 is a block diagram showing an example of pattern data according to a preferred embodiment of the present invention, with the pattern data (a) through (f) showing respective combinations of the pre-correction brightness value pattern with post-correction brightness value pattern that is mutually correlated for the extracted correction subject pixel and surrounding pixels thereof. That is, in the pattern data (a) through (f), the pattern of the pre-correction brightness value pattern is formed by the brightness values of a correction subject pixel (which is indicated by the "o" mark in the drawing) and surrounding 8 pixels thereof on a contour line, one post-correction brightness value pattern is allowed to exist for each pre-correction brightness value pattern, and the post-correction brightness value pattern is correlated with the pre-correction brightness value pattern for storing in a pattern data storage area of the pre-correction/post-correction brightness value pattern data storage means 18. Pattern data may be overlapped between a pre-correction and a post-correction for each piece of pattern data. As an example, the pre-correction brightness value pattern is overlapped in the pattern data (a) and (b), and the post-correction brightness value pattern is overlapped in the pattern data (e) and (f). And a brightness value of each pixel existing in a post-correction brightness value pattern is assumed to have a range (i.e., a range of brightness values) of plus or minus K. As an example, a range of brightness values is between 92 and 108 if a brightness value is 100 and the range K=8.

Now returning to FIG. 5, a correction subject brightness value range determination means 19 predetermines grayscale values of a range with which a character looks blotted at the time of being displayed in a screen as a range of correction subject brightness values, and correction subject brightness value range data is also read when reading the outline font data from the pre-correction outline font data storage unit 20 that possesses outline font data only and none of correction data. The setup range of correction subject brightness values is expressed by the aforementioned K value having a range of the plus and minus sides.

A correction subject pixel determination means 22 judges whether or not the brightness value of a pixel is within the range of correction subject brightness values with regard to the pre-correction outline font data read from the pre-correction outline font data storage unit 20 and also determines a correction subject pixel by putting an emphasis on whether or not the pixel is one existing on a contour line constituting a horizontal or vertical line with which a user tends to have a feel of a blot or fuzziness. Note that the "user" includes a person in charge of the resign (i.e., a font designer) related to the outline font.

A pre-correction brightness value pattern comparison means 31 searches, by a pattern comparison, a similar pattern from the pattern recorded by the above described pre-correction brightness value pattern recording means 12 with regard to the brightness value pattern of the determined correction subject pixel and surrounding pixels thereof. The pattern comparison employs either one of the existing pattern matching method used for a common image processing field. That is, the present embodiment is configured to employ a method of using a brightness value difference of pixels; another method, however, may be used, such as a method utilizing an eigenvector.

A post-correction brightness value pattern candidate derivation means 32 derives, from the pattern data recorded by the above described post-correction brightness value pattern data recording means 13, post-correction brightness value patterns corresponding to one or plurality of pre-correction brightness value patterns that are judged to be similar as a result of the pattern comparison, and lists them as candidates.

A post-correction brightness value pattern determination means 33 determines an optimal post-correction brightness value pattern based on the condition of having a range of brightness values common to the range of post-correction brightness values of all candidates from among the listed candidates for a post-correction brightness value pattern.

A post-correction brightness value determination means 34 determines an optimal post-correction brightness value in consideration of the contour line information from among the range of the post-correction brightness values of each pixel recorded in the optimal post-correction brightness value pattern that is determined by the post-correction brightness value pattern determination means 33.

A correction data addition & storage means 35 applies the post-correction brightness value determined by the post-correction brightness value determination means 34 to the pre-correction outline font data, adds a difference between the pre-correction character image and character image applied by the correction data, as eventual brightness value correction data, to pre-correction outline font data, and stores the resultant.

Note that, as is apparent from the comparison between FIGS. 4 and 5, the pre-correction/post-correction brightness value pattern production unit 15, which is shown in FIG. 4, according to the preferred embodiment of the present invention corresponds to the correction subject pixel extraction means 11, pre-correction brightness value pattern recording means 12 and post-correction brightness value pattern data recording means 13 for the configuration shown in FIG. 5; and the correction data calculation unit 30, which is shown in FIG. 4, according to the preferred embodiment of the present invention corresponds to the pre-correction brightness value pattern comparison means 31, post-correction brightness value pattern candidate derivation means 32, post-correction brightness value pattern determination means 33 and post-correction brightness value determination means 34 for the configuration shown in FIG. 5.

When drawing a character in a piece of equipment incorporating the outline font data added by the correction data that is thusly produced by the outline font brightness value correction system according to the preferred embodiment of the present invention, a character image is obtained by reading contour line data for one character from the outline font data, calculating and drawing a contour line position in the sequence described in the contour line data as commonly carried out, and painting over the inside of the contour lines. In this event, data used for a correction subject character is read from the added correction data and applied to the character to be displayed, thereby changing the brightness values of pixels within the image individually and obtaining a post-correction character image. Note that the contour line calculation and paint-over process use respective known techniques and therefore the detail descriptions thereof are omitted herein.

Figure 7A:
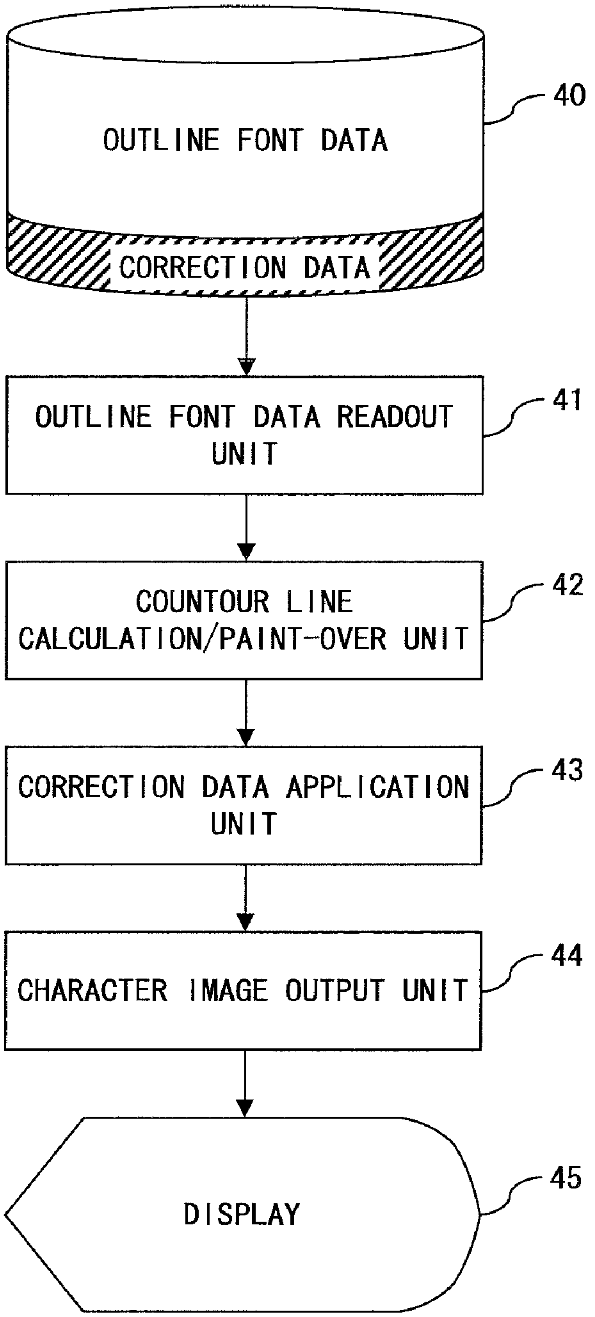
FIG. 7A is a block diagram showing a configuration of a character image display apparatus performing a character image display by applying an outline font added by correction data according to a preferred embodiment of the present invention.

FIG. 7A is a block diagram showing a configuration of a character image display apparatus performing a character image display by applying an outline font added by correction data according to the preferred embodiment of the present invention. Referring to FIG. 7A, the character image display apparatus comprises an outline font data storage unit 40 possessing outline font data and also is added by correction data newly produced according to the present invention, an outline font data readout unit 41 for reading the outline font data from the outline font data storage unit 40, a contour line calculation/paint-over unit 42 for calculating a contour line based on the readout outline font data and also carrying out the process for painting over the inside of the calculated contour lines, a correction data application unit 43 for applying the added correction data, a character image output unit 44 for outputting the character image applied by the correction data, and a display 45 for displaying the character image.

Figure 7B:
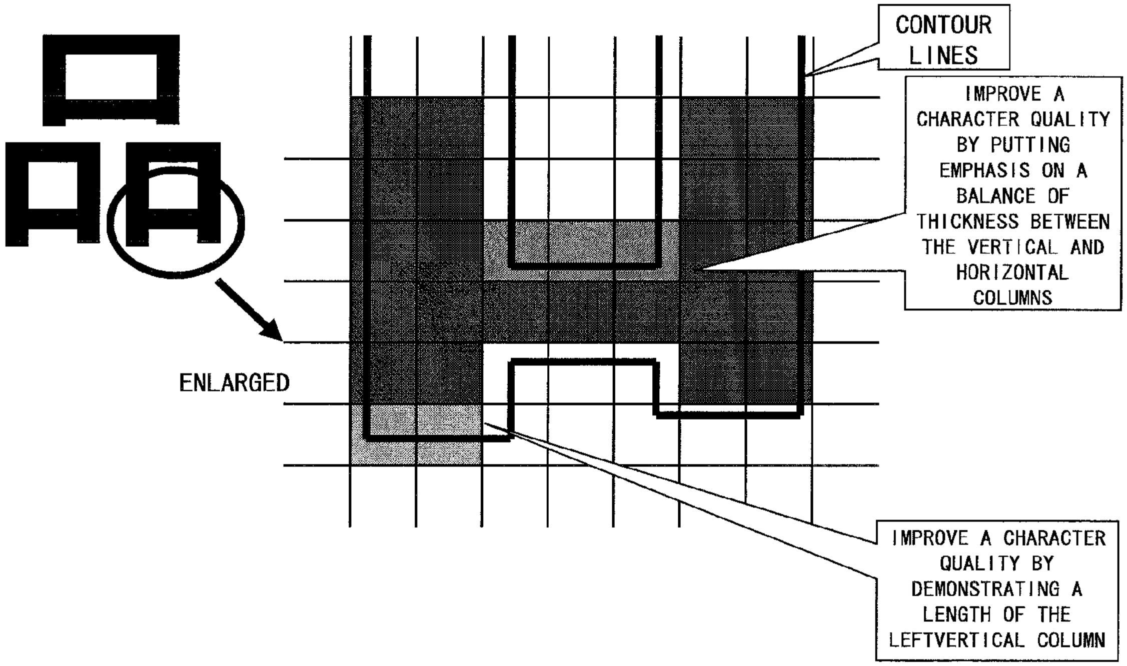
FIG. 7B is a block diagram showing an example of outline font character image display applied by the correction data displayed in the character image display apparatus shown in FIG. 7A.

FIG. 7B is a block diagram showing an example of outline font character image display applied by the correction data displayed in the character image display apparatus shown in FIG. 7A. When drawing a character in a piece of equipment incorporating the outline font data added by the correction data that is produced by the outline font brightness value correction system according to the preferred embodiment of the present invention, a good character image is made as well as no feel of unnaturalness is given in a grayscale display by putting emphasis on a balance of thicknesses between the vertical column and horizontal column of a character image with regard to the pixels existing on the right bottom side of the character "articles", and also a good character image is made as well as no feel of unnaturalness is given in a grayscale display by demonstrating the left vertical column of the character image in a larger length than the right vertical column thereof, as shown in FIG. 7B.

As such, the outline font brightness value correction system according to the preferred embodiment of the present invention is configured to accomplish a production and addition of correction data without taking an extended length of time for producing the correction data and adding it, and obtain a character image by applying the outline font data added by the correction data, thereby making it possible to eliminate a blot and/or uneven brightness value associated with carrying out a grayscale display and improve the character quality.

Figure 8:
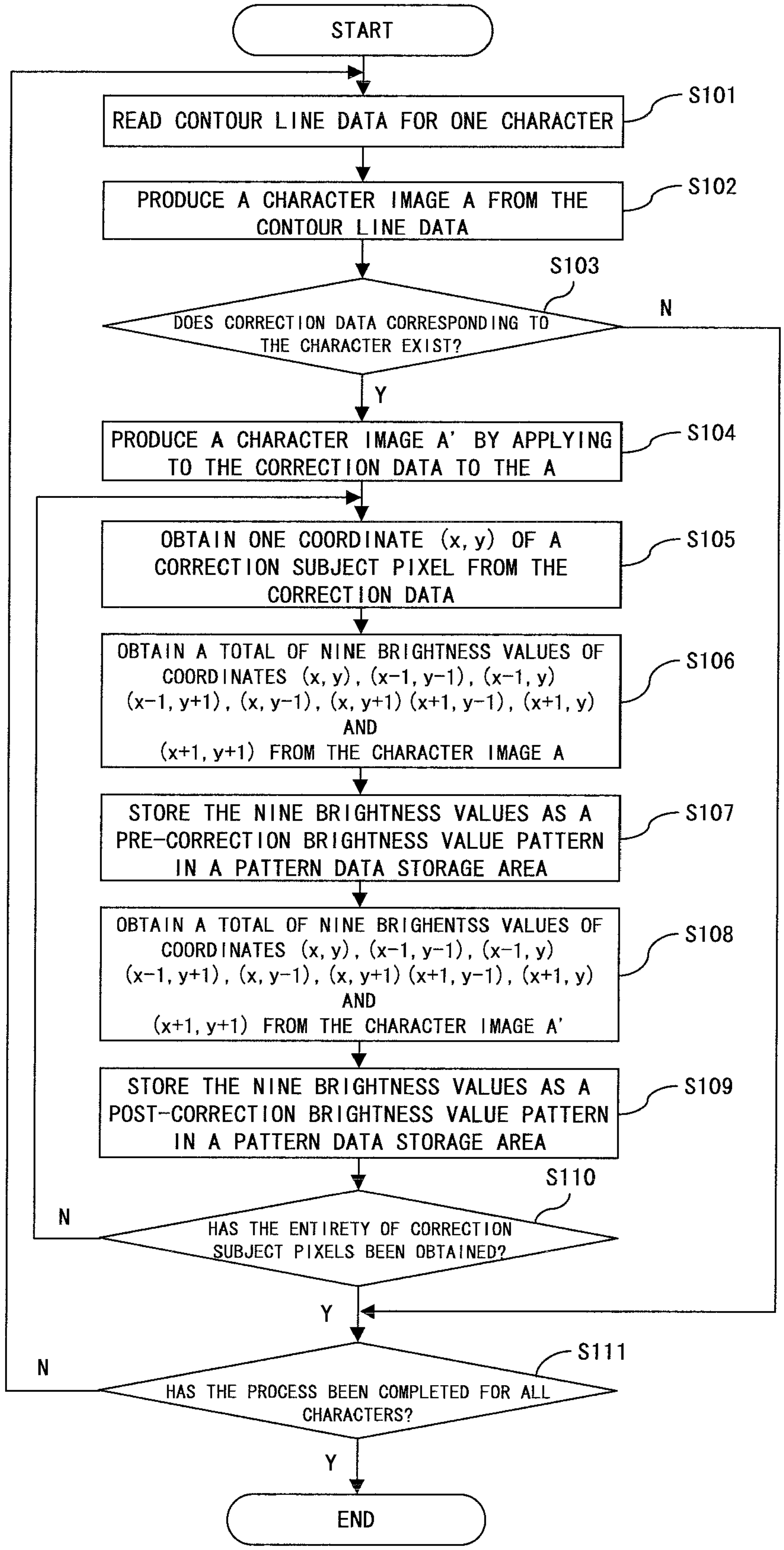
FIG. 8 is a flow chart describing a pattern data production operation at an outline font brightness value correction system according to a preferred embodiment of the present invention.

FIG. 8 is a flow chart describing a pattern data production operation at an outline font brightness value correction system according to the preferred embodiment of the present invention. The flow chart shown by FIG. 8 describes an operation of producing pattern data based on the existing outline font data to which the correction data produced by a manual work of a designer has been added when producing the pattern data. In the present embodiment, a brightness value of a character is assumed as 256 grayscales, and "surrounding" is defined as eight surrounding pixels of a correction subject pixel. Each step of FIG. 8 is abbreviated as "S" in the following description.

Referring to FIG. 8:

S101: reads contour line data for one character from the existing outline data.

S102: calculates a contour line by using the readout contour line data and produces a character image A.

S103: if data for correcting a subject character exists in the added correction data, the process shifts to S104, otherwise to S111.

S104: produces a character image A' by applying the correction data for a subject character.

S105: obtains one coordinate (x,y) of a correction subject pixel included in the correction data for the subject character.

S106: obtains a total of nine brightness values of a brightness value of pixels (x,y) and those of coordinates (x−1,y−1), (x−1,y), (x−1,y+1), (x,y−1), (x,y+1), (x+1,y−1), (x+1,y) and (x+1,y+1) from the character image A.

S107: stores the brightness values obtained in S106 as a pre-correction brightness value pattern in a pattern data storage area.

S108: obtains a total of nine brightness values likewise S106 from the character image A'.

S109: stores the brightness values obtained in S108 as a post-correction brightness value pattern in the pattern data storage area by correlating it with the pre-correction brightness value pattern.

S110: if the processes of S106 through S109 are completed for all correction subject pixels included in the correction data for a subject character, the process shifts to S111, otherwise to S105.

S111: if the processes of S102 through S110 for all characters included in the existing outline font data, the process ends, otherwise returns to S101.

Note that the above has described an example of producing a combination of a pre-correction brightness value pattern with a post-correction brightness value pattern based on the existing outline font data to which the correction data has been added; it may be, however, configured to produce a combination of a pre-correction brightness value pattern with a post-correction brightness value pattern separately and utilize it, in lieu of being based on the existing outline font data to which the correction data has been added.

FIGS. 9A through 9E show a flow chart describing a correction data production operation at an outline font brightness value correction system according to the preferred embodiment of the present invention.

The process flow shown by FIGS. 9A through 9E is an operation of applying a brightness value correction to pre-correction outline font data by using the pattern data produced by the pattern data production process shown in FIG. 8 and storing it by adding correction data. Note that the output of the correction data is constituted by the coordinate value of a correction subject pixel and the brightness value after a correction. The present embodiment is configured to allow a use of a method of using a brightness value difference of pixels, a method of utilizing an eigenvector, et cetera, as a process for matching with pattern data. Each step of FIGS. 9A through 9E is abbreviated as "S" in the following description.

Figure 9A:
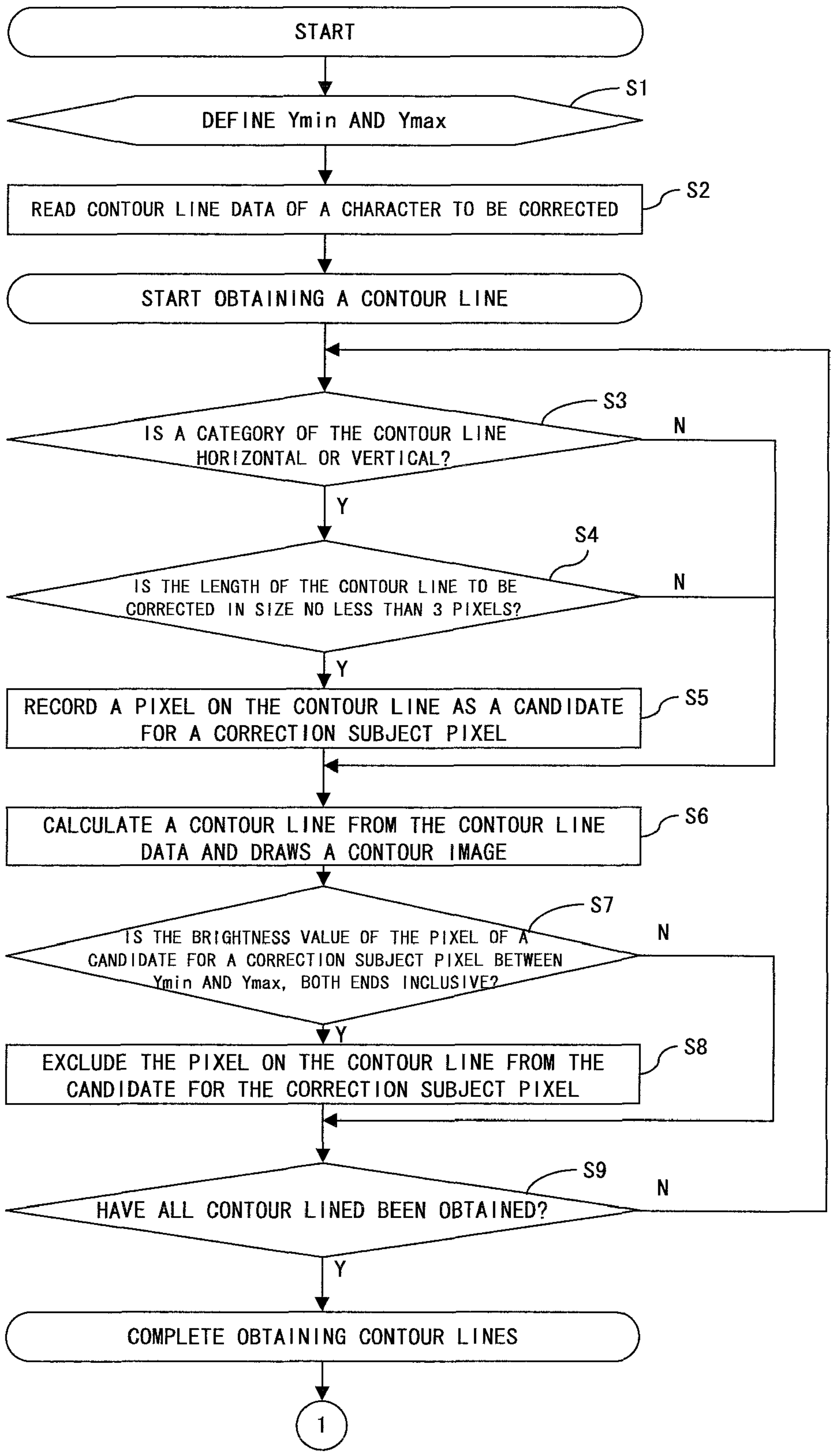
FIG. 9A is a flow chart describing a correction data production operation at an outline font brightness value correction system according to a preferred embodiment of the present invention.

Referring to FIG. 9A:

S1: defines threshold values Ymin (a lower limit) and Ymax (an upper limit) of a range of brightness values as a correction subject.

S2: Read contour line data from the pre-correction outline font data for drawing a character of which a brightness value is to be corrected.

S3: obtains one contour line in order starting from the head of the contour line data and, if the line category of the contour line is a horizontal or vertical line, the process shifts to S4, otherwise to S6.

S4: if the number of pixels is equal to or greater than "3" that is a length of the start point to end point when drawing a contour line in a size (i.e., width by height) as a subject of correction, the process shifts to S5, otherwise to S6.

S5: records a pixel on the contour line as a candidate for a correction subject pixel.

S6: calculates a contour line from the contour line data obtained in S3 and draws a contour image.

S7: when recording a candidate for the correction subject pixel in S5, if the brightness value of the pixel satisfies the threshold value between Ymin and Ymax, both ends inclusive, of the range of brightness values obtained in S1, the process shifts to S9, otherwise to S8.

S8: excludes the pixel recorded in S5 from the candidate for the correction subject pixel.

S9: if the entire contour lines included in the contour line data for one character are obtained, the process shifts S10, otherwise to S3.

Figure 9B:
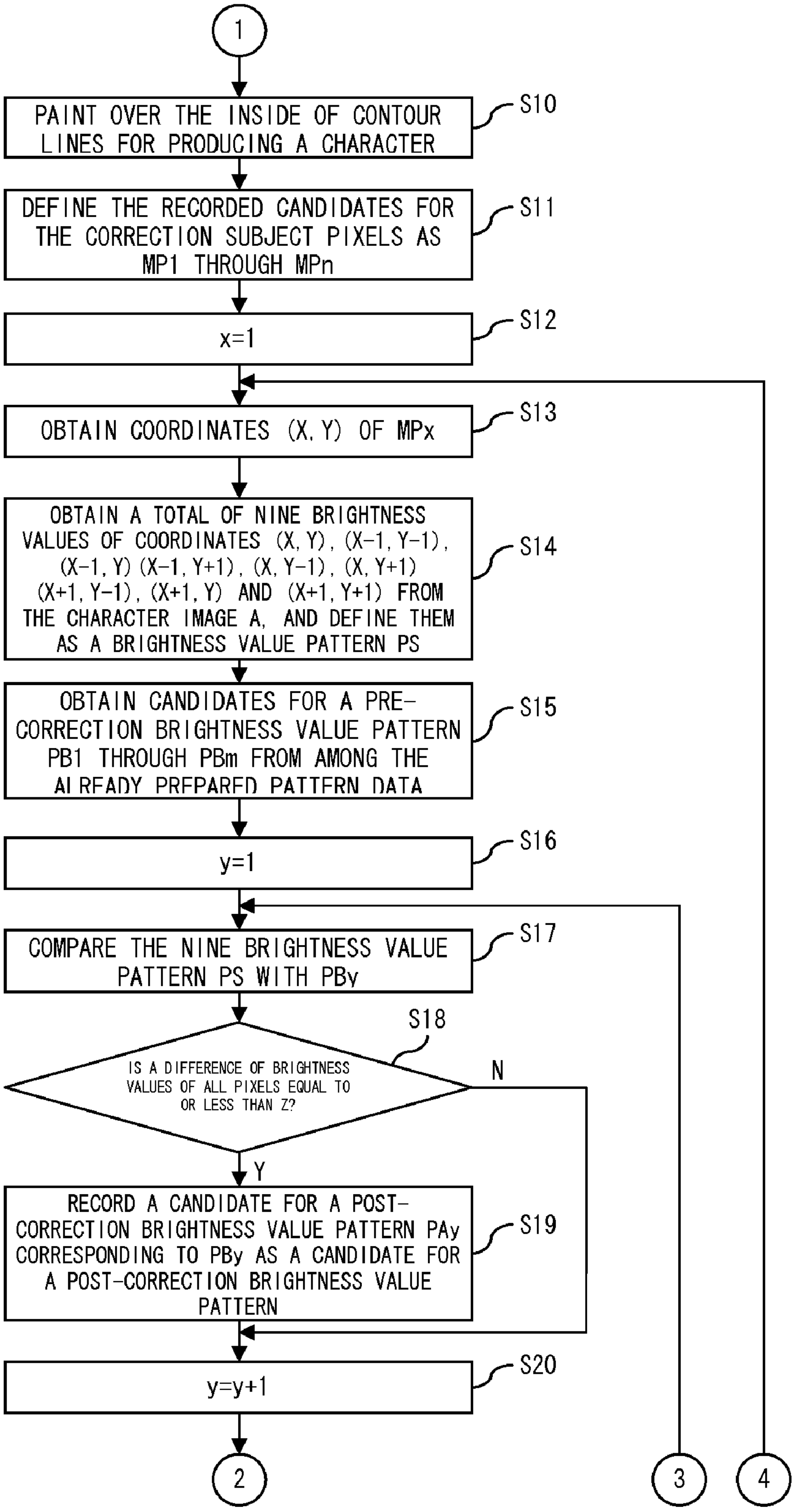
FIG. 9B is a flow chart describing a correction data production operation at an outline font brightness value correction system according to a preferred embodiment of the present invention.

Now moving to FIG. 9B:

S10: paints over the inside of contour lines of a drawn outline image for producing a character image A.

S11: if the recorded candidates for the correction subject pixels are an N-piece, defines them as MP1 through MPn in order and correlates with coordinates of the respective pixels.

S12: first lets x=1 for processing the candidates for the correction subject pixels in order.

S13: obtains coordinates (x,y) of a candidate for the correction subject pixel MPx.

S14: refers to the character image A, obtains brightness values corresponding to respective nine pixel coordinates (x−1,y−1), (x−1,y), (x−1,y+1), (x,y−1), (x,y+1), (x+1,y−1), (x+1,y) and (x+1,y+1), followed by defining them as a brightness value pattern PS.

S15: obtains candidates for pre-correction brightness value patterns PB1 through PBm from among the already prepared pattern data.

S16: first lets y=1 for processing the candidates for a pre-correction brightness value pattern in order.

S17: compares the brightness value pattern PS obtained in S14 with a candidate for a pre-correction brightness value pattern PBy.

S18: if a difference (i.e., an absolute value) of brightness values within the entire pixels of both patterns is equal to or less than a predefined threshold value Z, the process shifts to S19, otherwise to S20.

S19: records a candidate for a post-correction brightness value pattern PAy corresponding to the candidate for a pre-correction brightness value pattern PBy from among the pattern data as a candidate for a post-correction brightness value pattern for a surrounding pattern of the MPx.

S20: increments a value of y by "1" for referring to the next candidate for a pre-correction brightness value pattern.

Figure 9C:
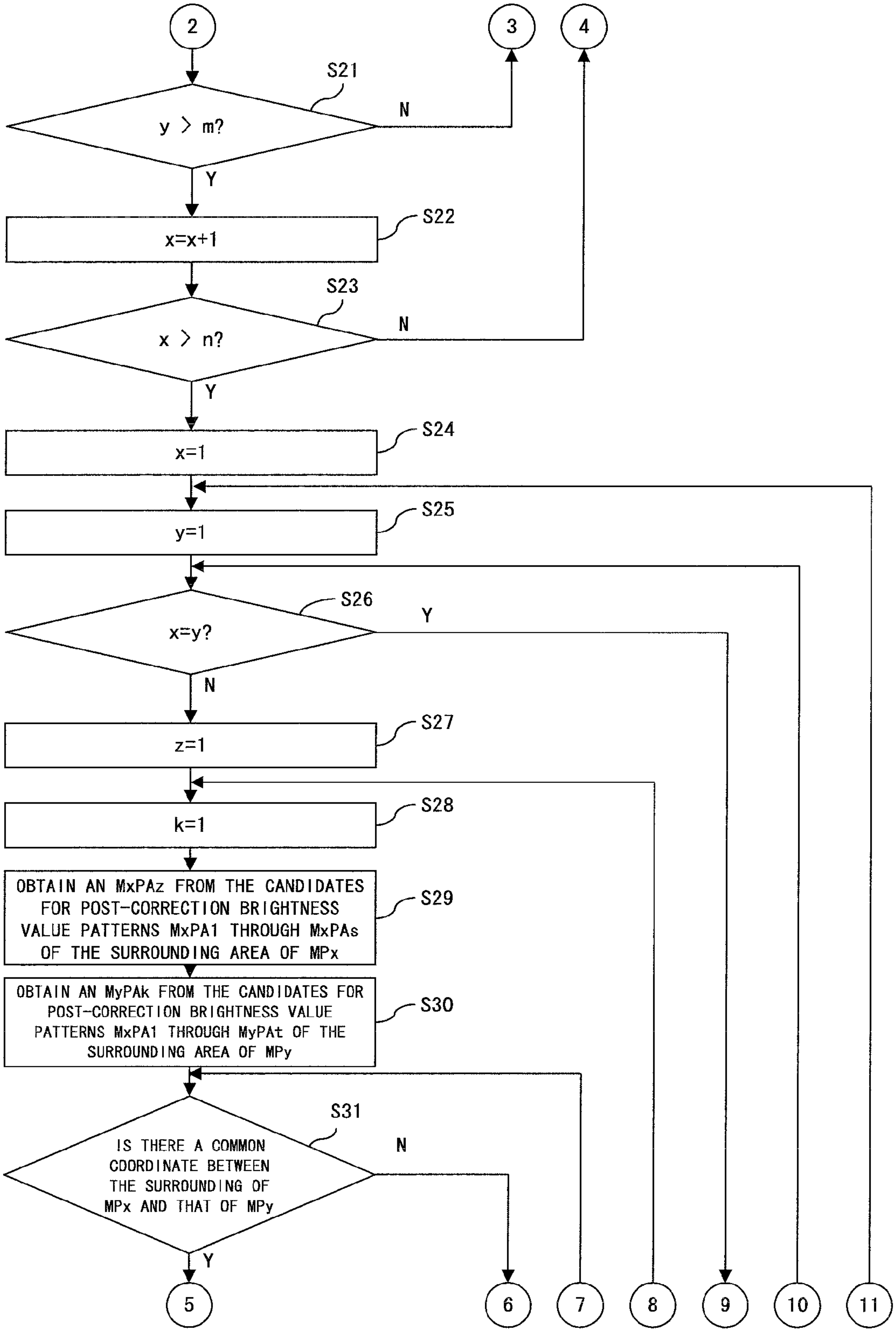
FIG. 9C is a flow chart describing a correction data production operation at an outline font brightness value correction system according to a preferred embodiment of the present invention.

Now moving to FIG. 9C:

S21: if the entirety of the candidates for a pre-correction brightness value pattern within the data pattern is already referred to, the process shifts to S22, otherwise to S17.

S22: increments a value of "x" by "1" for referring to the next candidate for a correction subject pixel.

S23: if the entirety of the candidates for correction subject pixels with in the character image is already referred to, the process shifts to S24, otherwise to S13 shown in FIG. 9B.

S24: first lets x=1 for processing the candidates for correction subject pixels in order.

S25: first lets y=1 for searching correction subject pixels in the surrounding area of a candidate for a correction subject pixel MPx.

Figure 9D:
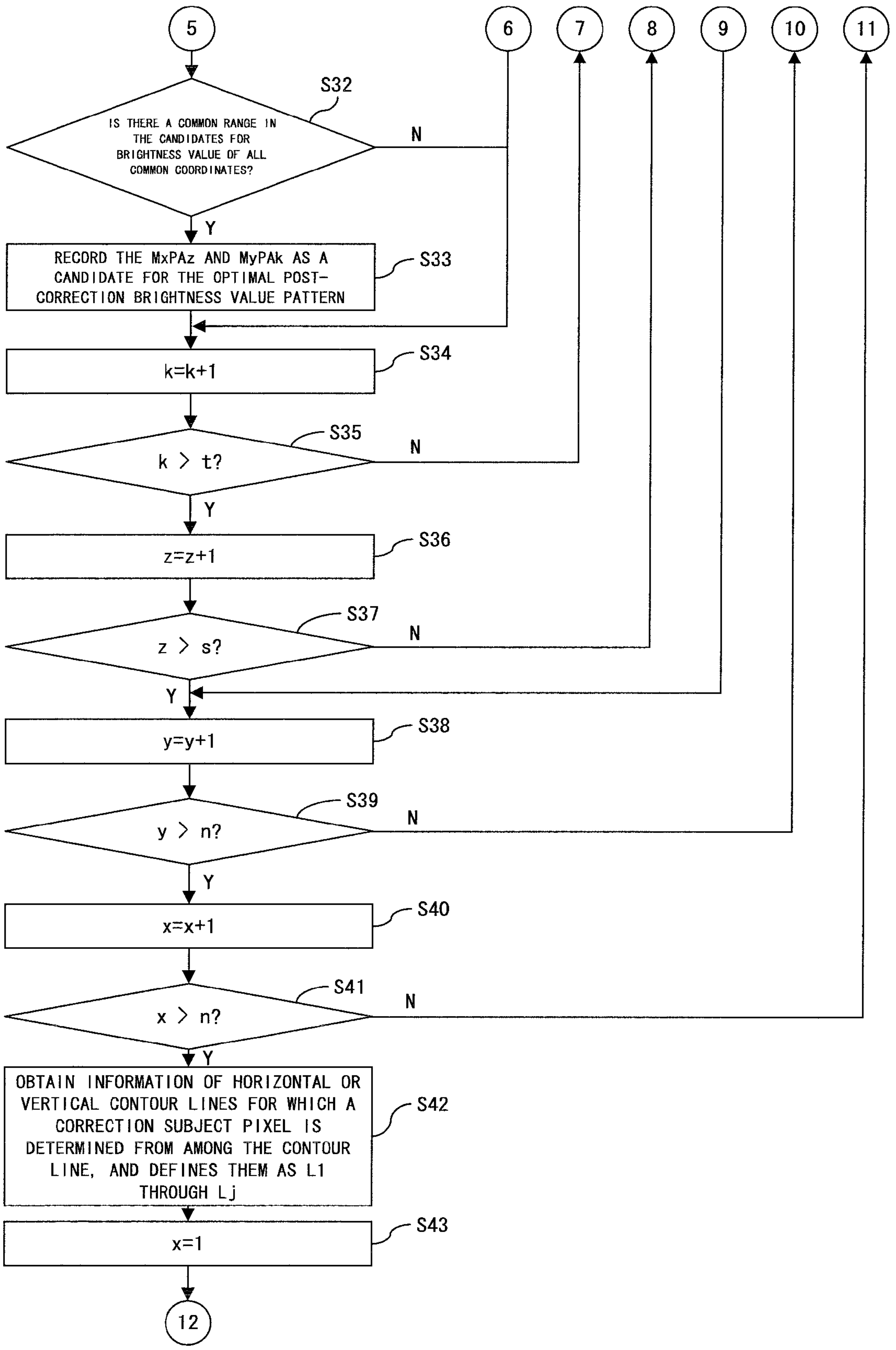
FIG. 9D is a flow chart describing a correction data production operation at an outline font brightness value correction system according to a preferred embodiment of the present invention.

S26: if a pair of the same candidates for correction subject pixels (i.e., x=y), no comparison is made and therefore the process shifts to S38 shown in FIG. 9D, otherwise to S27.

S27: lets z=1 for processing the candidates for a post-correction brightness value pattern in order in the surrounding area of a candidate for a correction subject pixel MPx.

S28: lets k=1 for processing the candidates for a post-correction brightness value pattern in order in the surrounding area of a candidate for a correction subject pixel MPy.

S29: assuming there are "s" pieces of the candidates for a post-correction brightness value pattern in the surrounding area of a candidate for a correction subject pixel MPx, and defining them as MxPA1 through MxPAs, obtains an MxPAz.

S30: assuming there are "t" pieces of the candidates for a post-correction brightness value pattern in the surrounding area of a candidate for a correction subject pixel MPy, and defining them as MyPA1 through MyPAt, obtains an MyPAk.

S31: if there is even a single common coordinate in a range of surrounding area of MPx and of surrounding area of MPy, the process shifts to S32 shown in FIG. 9D, otherwise to S34 shown therein.

Now moving to FIG. 9D:

S32: if there is a common range of brightness values in the range of post-correction brightness values recorded in the MxPAz and that of post-correction brightness values recorded in the MyPAk in the entirety of pixels determined to be common coordinates in S31, the process shifts to S33, otherwise to S34.

S33: records the MxPAz and MyPAk anew as a candidate for the optimal post-correction brightness value pattern.

S34: increments a value of k by "1" for obtaining the candidates for a post-correction brightness value pattern in the surrounding area of the next candidate for a correction subject pixel MPy.

S35: if the entirety of the candidates for a post-correction brightness value pattern in the surrounding area of the next candidate for a correction subject pixel MPy is already processed, the process shifts to S36, otherwise to S30 shown in FIG. 9C.

S36: increments a value of z by "1" for obtaining the candidates for a post-correction brightness value pattern in the surrounding area of the next candidate for a correction subject pixel MPx.

S37: if the entirety of the candidates for a post-correction brightness value pattern in the surrounding area of the next candidate for a correction subject pixel MPx is already processed, the process shifts to S38, otherwise to S28 shown in FIG. 9C.

S38: increments a value of y by "1" for referring to the next candidate for a correction subject pixel for comparison MPy.

S39: if the entirety of the candidates for correction subject pixels MPy and MPx are already compared, the process shifts to S40, otherwise to S26 shown in FIG. 9C.

S40: increments a value of x by "1" for referring to the next candidate for a correction subject pixel MPx as a reference for a comparison.

S41: if the process is already finished for the entirety of the candidates for a correction subject pixel MPx, the process shifts to S42, otherwise to S25 shown in FIG. 9C.

S42: obtains horizontal or vertical contour lines for which a correction subject pixel is determined from among the contour line data, and defines them as L1 through Lj.

S43: first lets x=1 for processing the obtained contour lines in order.

Figure 9E:
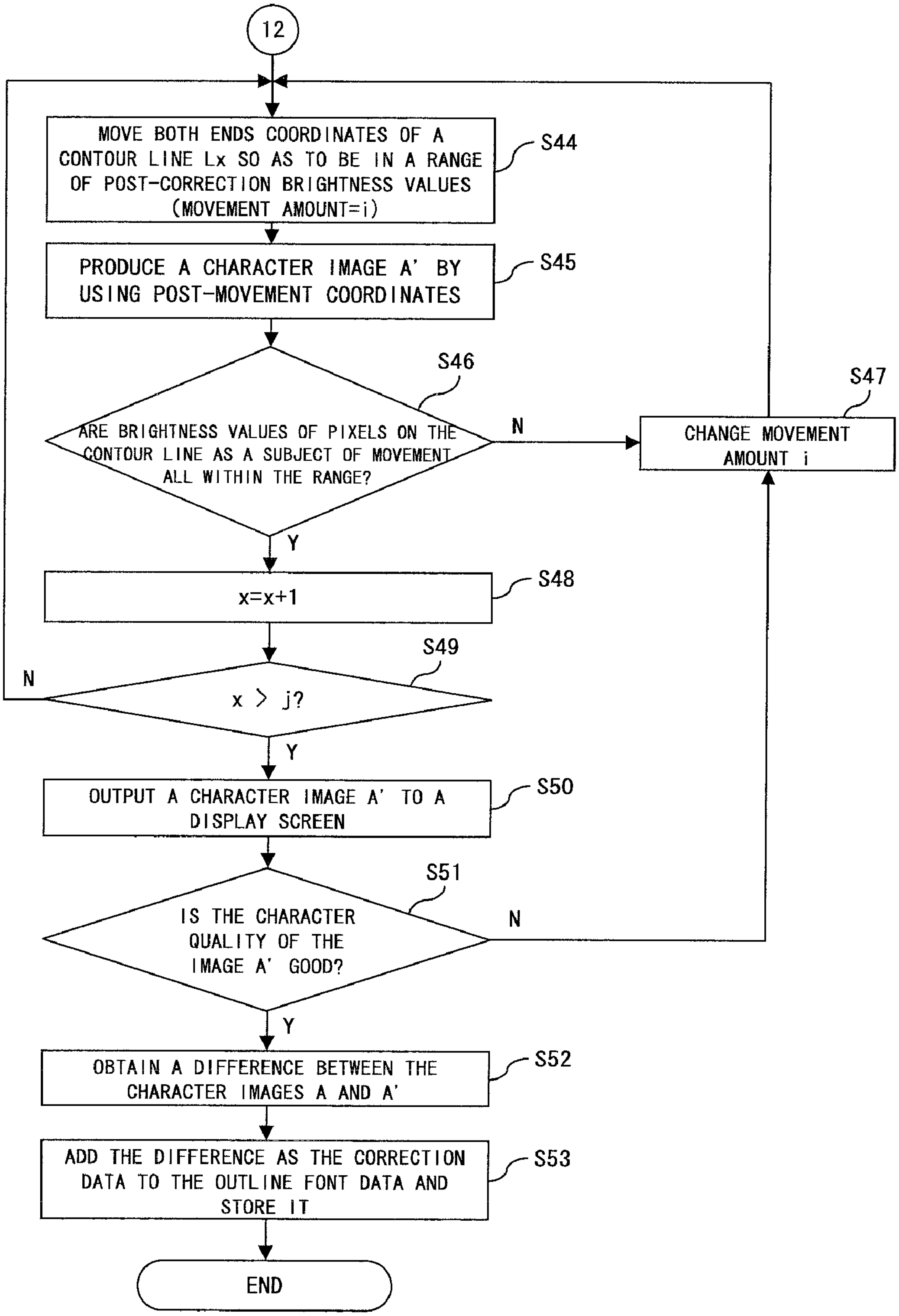
FIG. 9E is a flow chart describing a correction data production operation at an outline font brightness value correction system according to a preferred embodiment of the present invention.

Now moving to FIG. 9E:

S44: derives the smallest movement amount i in which a brightness value of a pixel on a contour line is within a range of post-correction brightness values described in one optimal post-correction brightness value pattern when moving coordinates of both ends of a contour line Lx.

S45: produces a character image A' by using the contour line data after moving the coordinates of both ends.

S46: referring to the character image A', if brightness values of the pixels on the line of the moved contour line and those of the surrounding area are within the range of brightness values described in the candidate for the optimal post-correction pattern, the process shifts to S48, otherwise to S47.

S47: increases a value of movement amount i of coordinates of both ends and shifts the process to S44.

S48: increments a value of "x" by "1" for making the next contour line as a subject of processing.

S49: if processes for the entirety of contour lines are already completed, the process shifts to S50, otherwise to S44.

S50: applies the movement amount determined in S46 to all coordinates, calculates contour lines and outputs a character image A' to a display screen.

S51: if there is no blot or uneven brightness value in the output character image A', with a good character quality, the process shifts to S52, otherwise to S47.

S52: compares the output character image A' with the pre-correction character image A, and obtains a different pixel as correction data.

S53: adds the correction data to the outline font data and stores it.

As described above, the outline font data added by the brightness value correction data according to the present invention is enabled to be incorporated not only in built-in equipment such as a portable phone and onboard information equipment (e.g., a car navigation system) but also various pieces of equipment carrying out a character display in a display screen.

What is claimed is:

1. An outline font brightness value correction system correcting a brightness value of a pixel for preventing a half tone from being regarded as a blot when a character of an outline font form is displayed in a grayscale, the outline font brightness value correction system comprising:

a pre-correction outline font data storage unit configured to store pre-correction outline font character data;

a brightness value pattern data storage unit configured to store data of a combination of a pre-correction brightness value pattern with a post-correction brightness value pattern;

an outline font data readout unit configured to read the pre-correction outline font character data from the pre-correction outline font data storage unit and to determine a correction subject pixel that requires a correction of a brightness value of a pixel related to a contour line included in the pre-correction outline font character data; and a correction data calculation unit configured to search a brightness value pattern similar to a pre-provided pre-correction brightness value pattern related to a brightness value pattern of the correction subject pixel and that of surrounding pixel thereof, to list up candidates for a post-correction brightness value pattern of an appropriate value as a post-correction brightness value from the combinations of the pre-correction brightness value pattern with the post-correction brightness value pattern related to a similar brightness value pattern, to derive a post-correction brightness value pattern uniquely from candidates for a post-correction brightness value pattern of the entirety of correction subject pixels of listed characters, and to determine an optimal post-correction brightness value in consideration of information on the contour line from a range of post-correction brightness values of each pixels of the derived unique post-correction brightness value pattern.

2. The outline font brightness value correction system according to claim 1, further comprising a brightness value pattern production unit configured to use outline font data of a result of adding already produced correction data and to extract a pre-correction brightness value pattern and a post-correction brightness value pattern corresponding thereto from the entire characters within the outline font data, followed by producing a combination of the former with latter.

3. The outline font brightness value correction system according to claim 2, wherein said pre-correction brightness value pattern and post-correction brightness value pattern are constituted by a correction subject pixel and surrounding pixels thereof, and a pattern of brightness values of pixels in a fixed range in accordance with a character size.

4. The outline font brightness value correction system according to claim 1, wherein said correction data calculation unit determines a pixel to be a correction subject pixel that requires a correction of a brightness value if said contour line is horizontal or vertical and if a brightness value of the pixel on a contour line, which is related to the contour line, is between an upper and a lower limit of a pre-set threshold value.

5. The outline font brightness value correction system according to claim 1, wherein said correction data calculation unit narrows down candidates to one based on a condition of including one or more common post-correction brightness values within a range of post-correction brightness values defined by individual patterns in a pixel where the patterns are overlapped with one another.

6. The outline font brightness value correction system according to claim 5, wherein said correction data calculation unit narrows down candidates to one based on a correction result of one or more candidates satisfying said condition if one or more candidates satisfying the condition are found when setting the condition of including one or more common post-correction brightness values within a range of post-correction brightness values defined by individual patterns in a pixel where the patterns are overlapped with one another.

7. The outline font brightness value correction system according to claim 1, wherein said correction data calculation unit determines a value that is one value within one or more post-correction brightness values commonly included in a range of post-correction brightness values that are derived from selected post-correction brightness patterns for all pixels on said contour line by a least movement amount when only one of the contour lines is moved horizontally or vertically.

* * * * *